United States Patent
Igashira

(10) Patent No.: US 9,824,716 B2
(45) Date of Patent: Nov. 21, 2017

(54) STORAGE CONTROL APPARATUS, STORAGE APPARATUS, AND COMPUTER-READABLE RECORDING MEDIUM HAVING STORED THEREIN STORAGE CONTROL PROGRAM

(71) Applicant: FUJITSU LIMITED, Kawasaki-shi, Kanagawa (JP)

(72) Inventor: Atsushi Igashira, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 15/048,409

(22) Filed: Feb. 19, 2016

(65) Prior Publication Data
US 2016/0284379 A1    Sep. 29, 2016

(30) Foreign Application Priority Data
Mar. 27, 2015   (JP) .................................. 2015-065499

(51) Int. Cl.
G06F 12/00   (2006.01)
G11B 19/28   (2006.01)
G11B 19/20   (2006.01)

(52) U.S. Cl.
CPC ............ *G11B 19/28* (2013.01); *G11B 19/209* (2013.01)

(58) Field of Classification Search
None
See application file for complete search history.

(56) References Cited

U.S. PATENT DOCUMENTS

| | | | |
|---|---|---|---|
| 9,703,500 B2 * | 7/2017 | Fiske | G06F 3/0625 |
| 2011/0307721 A1 * | 12/2011 | Ouchi | G06F 3/0625 |
| | | | 713/321 |

FOREIGN PATENT DOCUMENTS

| | | |
|---|---|---|
| JP | 2000-100054 | 4/2000 |
| JP | 2006-40437 | 2/2006 |
| JP | 2009-3831 | 1/2009 |

OTHER PUBLICATIONS

Hashimoto Shingi; "Will large-volume low-energy-consumption HDD develop a new market?", DOS/V Power Report, www.dosv.jp/other/0712/12.htm, [searched Dec. 17, 2014] Partial English translation (5 pages).

* cited by examiner

*Primary Examiner* — Baboucarr Faal
(74) *Attorney, Agent, or Firm* — Fujitsu Patent Center

(57) ABSTRACT

A checking unit configured to check whether or not each of the plurality of storage devices is a speed-changeable storage device capable of processing data at a plurality of rotation speeds, and a control unit configured to set a storage device among the plurality of storage devices that is checked to be the speed-changeable storage device to a first state operating at a first rotation speed that is a first threshold or less in a case where a data access to the storage device does not occur are included, whereby effective power saving can be realized in a simple manner.

11 Claims, 13 Drawing Sheets

FIG. 3

| MEMBER NAME | USE | EXAMPLE | NUMBER |
|---|---|---|---|
| USAGE | REPRESENTS USE STATE OF STORAGE | 0···UNUSED<br>1···HS (HOT SPARE)<br>2···CONFIGURED AS RAID | 1 |
| TYPE | REPRESENTS STORAGE TYPE | 0···UNKNOWN<br>1···FC<br>2···SATA<br>3···SSD<br>4···ROTATION SPEED-CHANGEABLE HDD | 1 |
| STATUS | REPRESENTS STATE OF STORAGE | 1···NORMAL<br>2···FAIL<br>3···REBUILD | 1 |
| ROTATE | REPRESENTS ROTATION SPEED OF STORAGE | NUMERICAL VALUE (FOR EXAMPLE, 10000 rpm) OF ROTATION SPEED IS SET<br>* "0" IS SET TO SSD | 1 |

| ECO MODE | ECO SCHEDULE | DURING ENERGY SAVING OPERATION (P ON OR M ON) | OPERATION FORM | CASE |
|---|---|---|---|---|
| INVALID | — | — | NORMAL OPERATION | CASE 1 |
| VALID | INVALID | — | NORMAL OPERATION | CASE 2 |
| | VALID | USER'S DETERMINATION | POWER SAVING OPERATION + NORMAL OPERATION | CASE 3 |
| | | FIRM-SIDE AUTOMATIC CONTROL | NORMAL OPERATION | CASE 4 |

FIG. 6

| PATTERN | TRANSITION | TRANSITION CONDITION | REMARKS |
|---|---|---|---|
| 1 | (P) CONTINUATION | NO ACCESS IN STATE OF DURING ECO (P) | |
| 2 | (P) → (M) | ---------- | |
| 3 | (P) → (L) | ACCESS IS PRESENT IN (P) STATE DURING ECO | * HEAVYLOAD IS APPLIED TO DEVICE IN CASE OF DIRECT TRANSITION FROM NO-ROTATION STATE TO HIGH ROTATION, AND THUS BASICALLY TRANSIT (P) → (L) |
| 4 | (P) → (H) | · ACCESS IS PRESENT IN (P) STATE DURING ECO<br>· COMMAND ISSUANCE NUMBER IS 90% OR MORE OF MAX VALUE<br>· NO ROTATION SPEED-CHANGEABLE HDD | * IN STATE IN WHICH COMMAND ISSUANCE NUMBER APPROACH MAX VALUE, USER'S RESPONSE TIME IS OUT OF ALLOWED RANGE, AND THUS, IT IS NECESSARY TO MAKE TRANSITION AT MAXIMUM SPEED OF (H) |
| 5 | (M) → (P) | ---------- | POSSIBILITY OF ACCESS DURING ECO IS HIGH, AND THUS (M) STATE IS KEPT |
| 6 | (M) CONTINUATION | NO ACCESS IN (M) STATE DURING ECO | |
| 7 | (M) → (L) | ACCESS IS PRESENT IN (M) STATE DURINGECO | * HEAVYLOAD IS APPLIED TO DEVICE IN CASE OF DIRECT TRANSITION FROM NO-ROTATION STATE TO HIGH ROTATION, AND THUS BASICALLY TRANSIT (M) → (L) |
| 8 | (M) → (H) | · ACCESS IS PRESENT IN (M) STATE DURING ECO<br>· COMMAND ISSUANCE NUMBER IS 90% OR MORE OF MAX VALUE<br>· NO ROTATION SPEED-CHANGEABLE HDD | * IN STATE IN WHICH COMMAND ISSUANCE NUMBER APPROACH MAX VALUE, USER'S RESPONSE TIME IS OUT OF ALLOWED RANGE, AND THUS, IT IS NECESSARY TO MAKE TRANSITION AT MAXIMUM SPEED OF (H) |
| 9 | (L) → (P) | ACCESS IS MADE ONCE OR LESS DURING ECO | |
| 10 | (L) → (M) | ACCESS IS MADE TWICE OR MORE DURING ECO | * THERE MAY BE ACCESS DURING ECO, AND THUS MAKE SWITCH TO (M) STATE (IN CASE OF (M) → (L) IS STARTED UP EARLIER THAN (P) → (L)) |
| 11 | (L) CONTINUATION | · ACCESS DURING ECO<br>· ACCESS OF FORMAT ONLY<br>· NO ACCESS DURING RELEASE OF ECO | * IN STATE IN WHICH NO ACCESS IS PRESENT EVEN WHEN ECO IS RELEASED, BY SETTING L ACCESS MODE, POWER SAVING IS ACHIEVED |
| 12 | (L) → (H) | · COMMAND ISSUANCE NUMBER IS 90% OR MORE OF MAX VALUE<br>· ACCESS OTHER THAN FORMAT IS PRESENT DURING RELEASE OF ECO | TARGET ONLY FOR ROTATION SPEED-CHANGEABLE HDD |
| 13 | (H) → (P) | ACCESS IS MADE ONCE OR LESS DURING ECO | |
| 14 | (H) → (M) | ACCESS IS MADE TWICE OR MORE DURING ECO | THERE MAY BE ACCESS DURING ECO, AND THUS, MAKE SWITCH TO (M) STATE (IN CASE OF (M) → (L) IS STARTED UP EARLIER THAN (P) → (L)) |
| 15 | (H) → (L) | · NO ACCESS OUTSIDE ECO TIME<br>· ACCESS OF FORMAT ONLY | IN CASE WHERE H ACCESS MODE IS MAINTAINED IN STATE IN WHICH NO ACCESS IS PRESENT, AND THUS MAKE SWITCH TO L ACCESS MODE<br>* TARGET ONLY ROTATION SPEED-CHANGEABLE HDD |
| 16 | (H) CONTINUATION | · ACCESS IS PRESENT | |

FIG. 7

| MEMBER NAME | USE | EXAMPLE | NUMBER |
|---|---|---|---|
| FUNC | REPRESENTS VALIDNESS/INVALIDNESS OF ECO MODE | 0···ECO INVALID<br>1···ECO VALID | 1 |
| TIME | REPRESENTS TIME OF ECO SCHEDULE | START TIME AND END TIME OF POWER SAVING OPERATION ARE MANAGED | 1 |
| MODE[xx] | MANAGE FOUR TYPES OF MODE IN UNITS OF STORAGES | 1···P-OFF<br>2···M-OFF<br>3···L ACCESS *<br>4···H ACCESS<br>* ONLY ROTATION SPEED-CHANGEABLE HDD TRANSIT TO L ACCESS MODE | xx:<br>NUMBER OF MOUNTED STORAGES |
| MODE_CHANGE_CNT[xx] | NUMBER OF TIMES OF SWITCHING AMONG FOUR TYPES OF MODE IN PERIOD OF ECO TIME IS MANAGED IN UNITS OF STORAGES | WHEN PERIOD OF ECO TIME ENDS, INITIALIZED TO ZERO | xx:<br>NUMBER OF MOUNTED STORAGES |

| MEMBER | STORAGE[0] USAGE | STORAGE[1] USAGE | STORAGE[5] *HS REGISTRATION USAGE | ECO MODE[0~3] | MODE[5] |
|---|---|---|---|---|---|
| INITIAL STATE | 0 (UNUSED) | 0 (UNUSED) | 0 (UNUSED) | 1 (P ON) | 1 (P ON) |
| (1) | 2 (USE RAID) | 2 (USE RAID) | | 3 (L ACCESS) | |
| (2) | | | | | |
| (3) | | | | | |
| (4) | | | | | |
| (5)HS DETECTION | | | | | |
| (6) | | | 1 (HS) | | 3 (L ACCESS) |
| (7) | | | | | |

FIG. 13

| | STORAGE[0] | STORAGE[1] | STORAGE[5] | STORAGE[6]<br>* HS REGISTRATION | ECO | | | |
|---|---|---|---|---|---|---|---|---|
| STATUS | 1 (NORMAL) | 1 (NORMAL)<br>→<br>2 (FAIL) | 1 NORMAL<br>→<br>3 (REBUILD) | 1 (NORMAL) | | | | |
| MEMBER | USAGE | USAGE | USAGE | USAGE | MODE[0~3] | MODE[5] | MODE[6] | |
| INITIAL STATE | 2 (USE RAID) | 2 (USE RAID) | 1 (HS) | 0 (UNUSED) | 3 (L ACCESS) OR 4 (H ACCESS) | 3 (L ACCESS) | 1 (P OFF) | |
| (1) | | | | | | | | |
| (2) | | | 2 (USE RAID) | | | 4 (H ACCESS) | | |
| (3) | | | | | 4 (H ACCESS) | | | |
| (4) | | | | | | | | |
| (5) | | | | | | | | |
| HS DETECTION | | | | | | | | |
| (6) | | | | 1 (HS) | | | 3 (L ACCESS) | |
| (7) | | | | | | | | | ns
STORAGE CONTROL APPARATUS, STORAGE APPARATUS, AND COMPUTER-READABLE RECORDING MEDIUM HAVING STORED THEREIN STORAGE CONTROL PROGRAM

CROSS-REFERENCE TO RELATED APPLICATION

This application is based upon and claims the benefit of priority of the prior Japanese Patent application No. 2015-065499, filed on Mar. 27, 2015, the entire contents of which are incorporated herein by reference.

FIELD

The embodiment discussed herein is directed to a storage control apparatus, a storage apparatus, and a computer-readable recording medium having stored therein a storage control program.

BACKGROUND

In storage apparatuses, in order to realize power saving, apparatuses in which a technology called massive array of idle disks (MAID) is mounted are known.

In the MAID, hard disk drives (HDD) in which any data access does not occur are stopped, and only HDDs in which data accesses occur are operated, whereby the power consumption is reduced.

In addition, a technique called an ecological mode is known in which power saving is achieved by managing the schedules of operation times of HDDs using the MAID.

In the ecological mode, a period of a time in which a power saving operation is executed is set by a user in advance as an ecological schedule, and the power saving operation is executed according to this ecological schedule.

In the power saving operation in the ecological mode, there are two kinds of modes including a motor-off (M-off) mode and a power-off (P-off) mode.

In the motor-off mode, by stopping a motor rotating a platter on which data is recorded, the power consumption is reduced. On the other hand, in the power-off mode, by stopping the supply of power to an HDD, the power consumption is reduced more than that of the motor-off mode.

However, in such conventional storage apparatuses, in a case where redundant arrays of inexpensive disks (RAID) are configured, a user needs to set validness/invalidness of the ecological mode in units of RAIDS. In addition, in a case where the ecological mode is set to be valid, the user needs to set presence/absence of an ecological schedule, and settings of a way of switching between the power-off mode and the motor-off mode in the period of an ecological schedule time and the like need to be made as well. In other words, the user needs to execute various setting operations relating to the ecological mode and the like, which is complicated.

In addition, as another technology for realizing power consumption, a rotation speed-changeable HDD that is an HDD capable of changing the rotation speed of a platter is known. Thus, by efficiently using such a rotation speed-changeable HDD, power saving is expected to be realized in a simple manner.

[Patent Literature 1] Japanese Laid-open Patent Publication No. 2009-3831

[Patent Literature 2] Japanese Laid-open Patent Publication No. 2000-100054

[Patent Literature 3] Japanese Laid-open Patent Publication No. 2006-40437

[Non Patent Literature 1] Shingi Hashimoto, "Will large-volume low-energy-consumption HDD develop a new market?", DOS/V POWER REPORT, www.dosv.jp/other/0712/12.htm, [searched Dec. 17, 2014]

SUMMARY

According to an aspect of the embodiments, to achieve the above object, a storage control apparatus for controlling a plurality of storage devices includes: a checking unit configured to check whether or not each of the plurality of storage devices is a speed-changeable storage device capable of processing data at a plurality of rotation speeds; and a control unit configured to set a storage device among the plurality of storage devices that is checked to be the speed-changeable storage device to a first state operating at a first rotation speed that is a first threshold or less in a case where a data access to the storage device does not occur.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an exemplary diagram that illustrates storage information in the storage apparatus as an example of the embodiment;

FIG. 4 is an exemplary diagram that illustrates a form of power control in the storage apparatus as an example of the embodiment;

FIG. 6 is a diagram that illustrates conditions for transitions among power control modes in the storage apparatus as an example of the embodiment;

FIG. 7 is an exemplary diagram that illustrates ecological information in the storage apparatus as an example of the embodiment;

FIG. 11 is an exemplary diagram that illustrates transitions among storage device states in a storage apparatus as an example of an embodiment;

FIG. 13 is an exemplary diagram that illustrates transitions among storage device states of the storage apparatus as an example of the embodiment.

DESCRIPTION OF EMBODIMENT(S)

Hereinafter, a storage control apparatus, a storage apparatus, and a computer-readable recording medium having stored therein a storage control program according to an embodiment will be described with reference to the drawings. However, the embodiment described below is merely an example but is not for the purpose of excluding various modified examples or the application of various technologies that are not explicitly represented in the embodiment. In other words, in this embodiment, various changes can be made in a range not departing from the concept. Each diagram is not intended to include only constituent elements illustrated in the diagram but may include any other function and the like.

(A) Configuration

Figure 1:
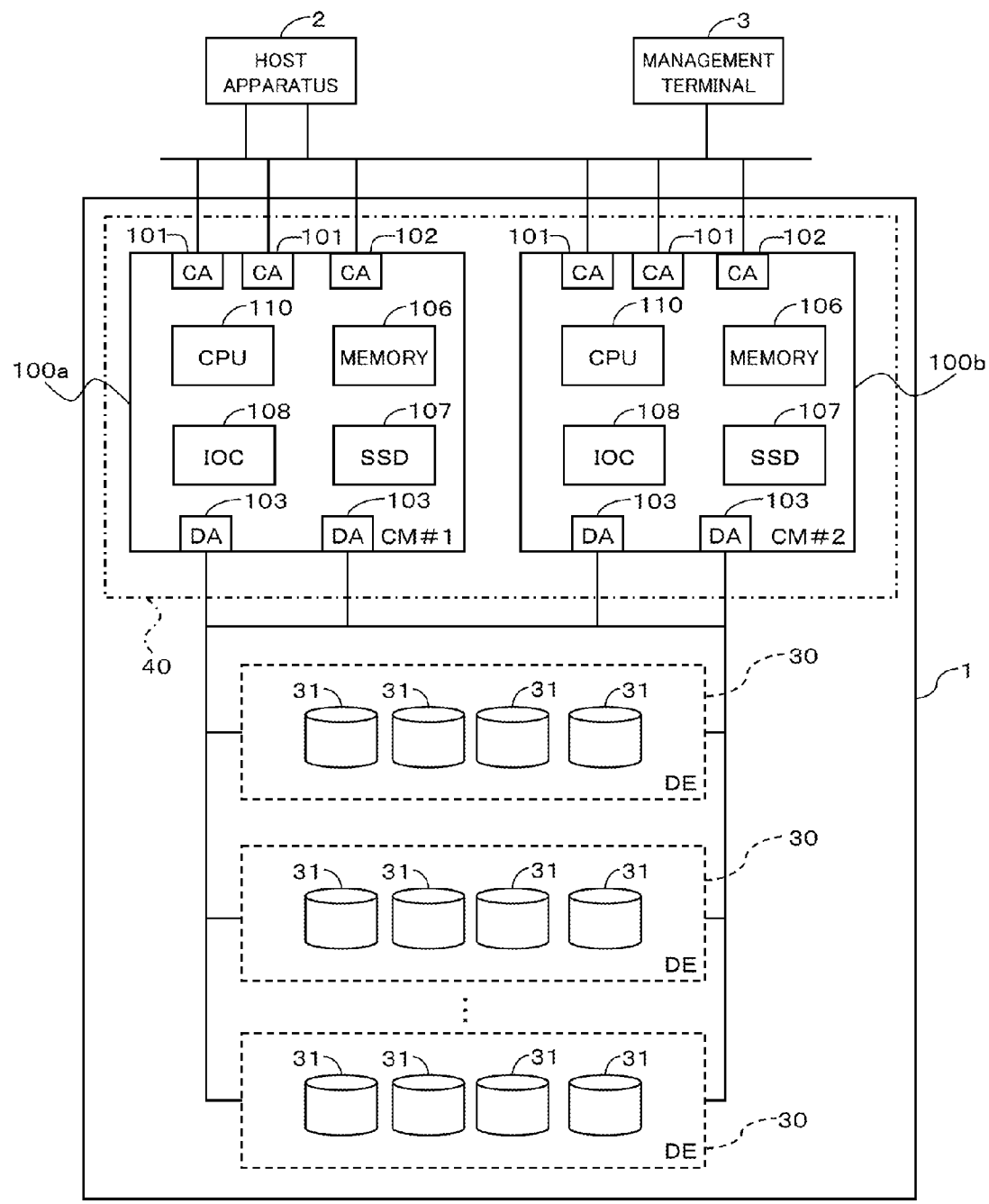
FIG. 1 is a diagram that schematically illustrates the hardware configuration of a storage apparatus as an example of an embodiment.
Figure 2:
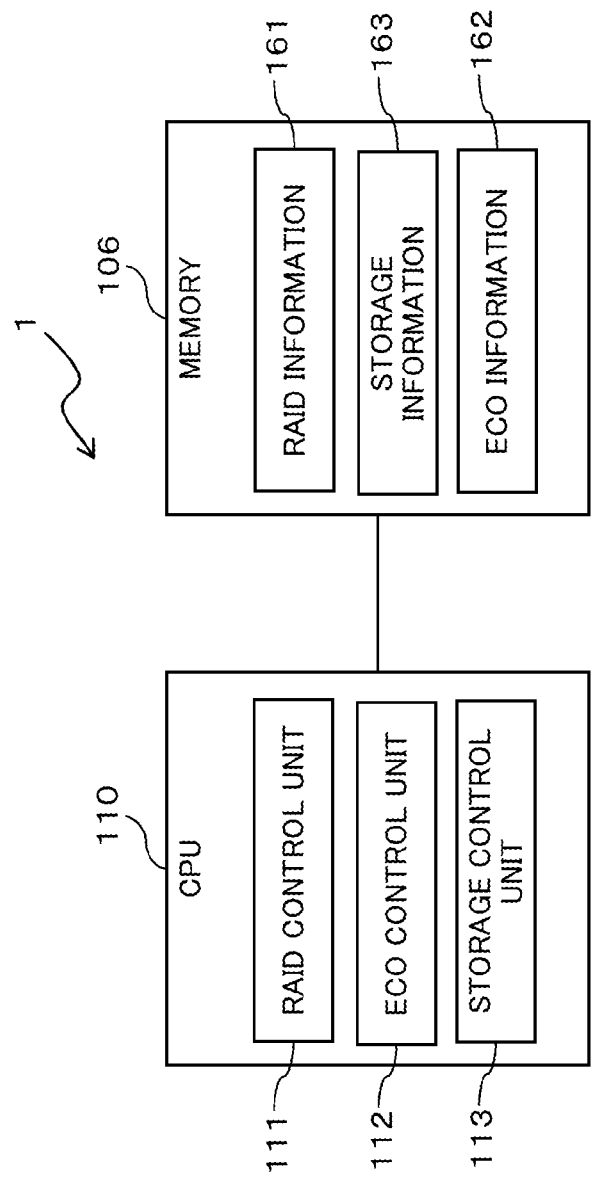
FIG. 2 is a diagram that illustrates the functional configuration of the storage apparatus as an example of the embodiment.

FIG. 1 is a diagram that schematically illustrates the hardware configuration of a storage apparatus 1 as an example of an embodiment, and FIG. 2 is a diagram that illustrates the functional configuration thereof.

The storage apparatus 1 forms a virtual storage environment by virtualizing a storage device 31 stored in a drive enclosure (DE) 30. Then, the storage apparatus 1 provides a host apparatus 2 that is a higher-level apparatus with a virtual volume.

The storage apparatus 1 is connected to one or more (in the example illustrated in FIG. 1, one) host apparatuses 2 in a communicable manner. The host apparatus 2 and the storage apparatus 1 are connected through communication adapters (CAs) 101 and 102 to be described later.

The host apparatus 2, for example, is an information processing apparatus having a server function and transmits/receives a command of a network attached storage (NAS) or a storage area network (SAN) to/from the storage apparatus 1. The host apparatus 2, for example, transmits a storage access command such as a read, a write, or the like of the NAS to the storage apparatus 1, thereby writing/reading data into/from a volume provided by the storage apparatus 1.

Then, in response to an input/output request (for example, a read command or a write command) that is executed by the host apparatus 2 for a volume, the storage apparatus 1 executes a process such as data reading or data writing for a storage device 31 corresponding to the volume. The input/output request from the host apparatus 2 may be referred to as an I/O command or an I/O request.

In the example illustrated in FIG. 1, while one host apparatus 2 is illustrated, the number of host apparatuses is not limited thereto, but two or more host apparatuses 2 may be connected to the storage apparatus 1.

A management terminal 3 is connected to the storage apparatus 1 in a communicable manner. The management terminal 3 is an information processing apparatus including an input device such as a keyboard or a mouse and a display device, and a user such as a system management supervisor executes an operation of inputting various kinds of information.

For example, a user inputs various settings relating to a RAID, a setting of an ecological schedule to be described later, or the like through this management terminal 3. Such input information is transmitted to the host apparatus 2 or the storage apparatus 1.

The storage apparatus 1, as illustrated in FIG. 1, includes a plurality of (two in this embodiment) controller modules (CMs) 100a and 100b and one or more (three in the example illustrated in FIG. 1) drive enclosures 30.

The drive enclosure 30 can have one or more (four in the example illustrated in FIG. 1) storage devices (physical disks) 31 mounted thereon and provides storage areas (actual volumes or actual storages) of the storage devices 31 for the storage apparatus 1.

For example, the drive enclosure 30 includes multiple stages of slots (not illustrated in the drawing) and, by inserting the storage devices 31 into such slots, the actual capacity of the volume can be changed at any time. In addition, by using a plurality of the storage devices 31, RAID may be configured.

The storage device 31 is a storage device such as an HDD or a solid state drive (SSD) and stores various kinds of data. Hereinafter, in this embodiment, an example will be illustrated in which the HDD is mainly used as the storage device 31.

The HDD, for example, includes: a disk-shaped platter having a magnetic layer formed on the surface thereof and being capable of recording data; a spindle motor rotating the platter; and a magnetic head executing data writing and data reading for the platter.

In addition, as the HDD, a rotation speed-changeable HDD configured to change the rotation speed of the motor may be used.

Each drive enclosure 30 is connected to device adapters (DAs) 103 and 103 of the CM 100a and DAs 103 and 103 of the CM 100b. Any one of the CMs 100a and 100b can read or write data by accessing the drive enclosure 30. In other words, by connecting the CMs 100a and 100b to the storage devices 31 of the drive enclosure 30, access paths for the storage devices 31 are configured to be redundant.

A controller enclosure 40 includes one or more (two in the example illustrated in FIG. 1) CMs 100a and 100b.

The CMs 100a and 100b are controllers (storage control apparatuses; information processing apparatuses) that control the operation executed inside the storage apparatus 1 and perform various control operations such as control of data accesses from the drive enclosure 30 to the storage devices 31 according to an I/O command transmitted form the host apparatus 2. The CM 100a and 100b have configurations that are almost the same. Hereinafter, as a reference sign representing the CM, when one of the plurality of CMs needs to be specified, reference sign 100a or 100b will be used, and, when an arbitrary CM is to be represented, reference sign 100 will be used. The CM 100a may be represented as CM #1, and the CM 100b may be represented as CM #2.

In the drawings, the same reference numeral denotes a same portion or portions that are approximately the same, and thus, detailed description thereof will not be presented.

The CMs 100a and 100b are configured to be redundant, and, normally, the CM 100a performs various control operations as a primary communication module. However, when the primary CM 100a fails, the CM 100b that is a secondary communication module successes the operation of the CM 100a as a primary communication module.

The CMs 100a and 100b are connected to the host apparatus 2 respectively through the CAs 101 and 102. Each of the CMs 100a and 100b receives an I/O command such as a read command or a write command transmitted from the host apparatus 2 and controls the storage device 31 through the DA 103 and the like. In addition the CMs 100*a* and 100*b* are connected together through an interface such as a peripheral component interconnect express (PCIe) that is not illustrated in the drawing.

The CM 100, as illustrated in FIG. 1, includes CAs 101 and 102 and a plurality of (two in the example illustrate in FIG. 1) DAs 103 and 103 and also includes a central processing unit (CPU) 110, a memory 106, an SSD 107, and an input output controller (IOC) 108.

Each of the CAs 101 and 102 receives data transmitted from the host apparatus 2, the management terminal 3, or the like and transmits data output from the CM 100 to the host apparatus 2, the management terminal 3 or the like. In other words, each of the CAs 101 and 102 controls input/output (I/O) of data for an external apparatus such as the host apparatus 2.

The CA 101 is a network adapter connecting the host apparatus 2 and the management terminal 3 through the NAS in a communicable manner and, for example, is a local area network (LAN) interface, or the like.

The CM 100 is connected to the host apparatus 2 and the like through a communication line by the CA 101 through the NAS and performs reception of an I/O command, transmission/reception of data, and the like. In addition, the CM 100 is connected to the management terminal 3 through the CA 101.

In the example illustrated in FIG. 1, two CAs 101 and 101 are included in each of the CM 100*a* and 100*b*.

The CA 102 is a network adapter connecting the host apparatus through the SAN in a communicable manner and, for example, is an internet small computer system interface (iSCSI), a fibre channel (FC) interface, or the like.

The CM 100 is connected to the host apparatus 2 and the like through a communication line, which is not illustrated in the drawing, by the CA 102 through the SAN and performs reception of an I/O command, transmission/reception of data, and the like. In the example illustrated in FIG. 1, one CA 102 is included in each of the CMs 100*a* and 100*b*.

The DA 103 is an interface used for communicably connecting the drive enclosure 30, the storage device 31, and the like. The DA 103 is connected to the storage device 31 of the drive enclosure 30, and the CM 100 executes access control for such a storage device 31 based on an I/O command received from the host apparatus 2.

The CM 100 executes data reading or data reading for the storage device 31 through the DA 103. In the example illustrated in FIG. 1, two DAs 103 and 103 are arranged in each of the CMs 100*a* and 100*b*. In addition, the drive enclosure 30 is connected to each of the DAs 103 in each of the CMs 100*a* and 100*b*.

Accordingly, any of the CMs 100*a* and 100*b* can execute data reading or data writing for the storage devices 31 of the drive enclosure 30.

The SSD 107 is a storage device that stores programs executed by the CPU 110, various kinds of data, and the like.

The memory 106 is a storage device that temporarily stores various kinds of data and programs and includes a memory region and a cache region that are not illustrated in the drawing. The cache region temporarily stores data received from the host apparatus 2 or data to be transmitted to the host apparatus 2. When the CPU 110 executes a program, the CPU 110 uses the memory region by temporarily storing and developing data or a program therein.

In addition, in the memory region, as illustrated in FIG. 2, RAID information 161, storage information 163, and ecological information 162 are stored. The RAID information 161, the storage information 163, and ecological information 162 will be described later in detail.

The IOC 108 is a control device that controls data transmission executed inside the CM 100 and, for example, realizes direct memory access (DMA) transmission for transmitting data stored in the memory 106 not through the CPU 110.

The CPU 110 is a processing unit that performs various control operations and arithmetic operations and is a multi-core processor (multiple CPUs). By executing an OS or a program stored in the SSD 107 or the like, the CPU 110 realizes various functions.

By executing a control program, as illustrated in FIG. 2, the CPU 110 serves as a RAID control unit 111, an ecological control unit 112, and a storage control unit 113.

In addition, a program (storage control program) used for realizing the functions of the RAID control unit 111, the ecological control unit 112, and the storage control unit 113, for example, is provided in a form being recorded on a computer-readable recording medium such as a flexible disk, a CD (a CD-ROM, a CD-R, a CD-RW, or the like), a DVD (a DVD-ROM, a DVD-RAM, a DVD-R, a DVD+R, a DVD-RW, a DVD+RW, an HD DVD, or the like), a Blu-ray disk, a magnetic disk, an optical disc, or a magneto-optical disk. Then, a computer reads the program from the recording medium and transmits the program to an internal storage device or an external storage device so as to be stored therein for the use. Alternatively, the program may be configured to be recorded in a storage device (recording medium) such as a magnetic disk, an optical disc, or a magneto-optical disk and provided from the storage device for the computer through a communication path.

In order to realize the functions of the RAID control unit 111, the ecological control unit 112, and the storage control unit 113, the program stored in the internal storage device (the RAM or the ROM of the memory 106) is executed by a microprocessor (the CPU 110 in this embodiment) of the computer. At this time, the program that is stored on a recording medium may be read and executed by the computer.

The RAID control unit 111 realizes a RAID using the storage devices 31 and controls the storage devices 31 configuring the RAID. In other words, the RAID control unit 111 sets a redundant configuration using a plurality of the storage devices 31.

This RAID control unit 111 sets a RAID group by using the plurality of the storage devices 31 and executes various kinds of RAID control operations. The management of the RAID is executed using the RAID information 161. The RAID information 161 manages various kinds of information used for realizing the RAID, and, for example, information of the storage devices 31 configuring a RAID group, and the like are registered therein.

The management of the RAID executed by the RAID control unit 111 and the RAID information 161 can be realized using a known technique, and thus, the description thereof will not be presented.

The RAID control unit 111 sets and manages a LUN (logical volume) by using the storage devices 31, and the host apparatus 2 executes a data access to the set LUN. In other words, the RAID control unit 111 also has a function of a LUN managing unit that manages the LUN. The RAID control unit 111 manages RAID logical unit (RLU) that is a logical storage area of the RAID group.

The management of the LUN that is executed by the RAID control unit 111 can be realized using a known technique, and thus the description thereof will not be presented.

The storage control unit 113 manages the storage devices 31 included in the storage apparatus 1. This storage control unit 113 manages each storage device 31 by using the storage information 163.

FIG. 3 is an exemplary diagram that the illustrates the storage information 163 in the storage apparatus 1 as an example of the embodiment In the example illustrated in FIG. 3, the storage information 163 includes "Usage", "Type", "Status", and "Rotate" as information (member names) to be managed and is configured to associate such information with each other.

Such storage information 163 is included for each storage device 31 and is stored in a memory region (for example, a cache region of the memory 106) that can be shared among the CMs 100.

The "Usage" represents a use state of the storage device 31. For example, as the Usage, "0" in a case where the storage device 31 is unused, "1" in a case where the storage device is a hot spare (HS), "2" in a case where the storage device configures a RAID is registered.

Here, the HS is a preliminary storage device (substitute storage device) that is preliminarily arranged in preparation for a failure of the storage device 31 included inside the RAID device. The RAID control unit 111 also executes management of the HS.

When the storage device 31 belonging to the RAID group fails, a rebuild process is executed in which data of the storage device 31 that has failed is rebuilt in an HS by using data of the storage devices 31 other than the storage device 31, which has failed, in the same RAID group. By executing this rebuild process, the redundancy of the RAID group is recovered. The rebuild process is a known technology, and thus, detailed description thereof will not be presented.

The "Type" represents the type of the storage device 31. For example, "1" in a case where the storage device 31 is an FC disk drive, "2" in a case where the storage device is a SATA disk drive, "3" in a case where the storage device is an SSD, and "4" in a case where the storage device is a rotation speed-changeable HDD is registered. In a case where the type of the storage device 31 is not clear, "0" is registered therein.

The "Status" represents the state of the storage device 31. For example, "1" in a case where the state of the storage device 31 is normal, "2" in the case of a failure state, and "3" in the case of being in the middle of rebuilding is registered.

The "Rotate" represents the rotation speed of the storage device 31, and a numerical value (for example, 10,000 rpm) of the rotation speed of the disk is set. For an SSD, for example, "0" is registered therein. In a case where the storage device 31 is a rotation speed-changeable HDD, a set value of the rotation speed at that time point is registered.

The number of data registered in each of the "Usage", the "Type", the "Status", and "Rotate" is one.

The storage control unit 113 manages the state and the like of each storage device 31 by using the storage information 163 and appropriately updates each value included in the storage information 163.

In addition, the storage control unit 113 executes control of switching among operation states of each storage device 31 based on the power control mode set by the ecological control unit 112 to be described later.

The ecological control unit 112 executes power control of the storage apparatus 1.

In this storage apparatus 1, in contrast to a normal operation operating without achieving a reduction in the amount of power consumption, an operation executed by reducing the amount of power consumption to be less than that of the normal operation will be referred to as an energy-saving operation or energy-saving driving.

In this storage apparatus 1, a user such as a system management supervisor sets the validness/invalidness of the ecological mode in units of RAIDs through the management terminal 3. In a case where the ecological mode is valid, control for reducing the power consumption is executed, and the power-saving operation is executed.

In a case where the ecological mode is set to be valid, the user additionally executes a setting for the validness/invalidness of an ecological schedule. In a case where the ecological schedule is in a valid state, the energy-saving operation is executed in a defined period of time (period of the ecological time), and any one state of the power (P)-off mode and the motor (M)-off mode is formed.

FIG. 4 is an exemplary diagram that illustrates a form of power control in the storage apparatus 1 as an example of the embodiment. In the example illustrated in FIG. 4, regarding the power control, combinations of the ecological mode, the ecological schedule, and being in the middle of the power-saving operation will be illustrated with being classified into Cases 1 to 4. Hereinafter, the classification of such Cases 1 to 4 may be referred to as an ecological case.

In Case 1, the ecological mode is in the invalid state. In this Case 1, the operation form is the normal operation.

In Case 2, the ecological mode is valid, and the ecological schedule is in the invalid state. Also in this Case 2, the operation form is the normal operation.

In Case 3, each of the ecological mode and the ecological schedule is in the valid state, and the mode of the period of the ecological time (in other words, during the power-saving operation) is determined by a user such as a system management supervisor. The user inputs and sets any one of the P-off mode and the M-off mode through the management terminal 3 in advance as the mode of the period of the ecological time.

In Case 4, each of the ecological mode and the ecological schedule is in the valid state, and the mode of the period of the ecological time (in other words, during the power-saving operation) is determined by firmware (storage control program; the ecological control unit 112) of this storage apparatus 1. A method of determining the P-off mode or the M-off mode as the mode of the period of the ecological time by using the ecological control unit 112 will be described later.

In Cases 3 and 4, an energy-saving operation is executed in the period of the ecological time, and a normal operation is executed in the other time period.

Figure 5:
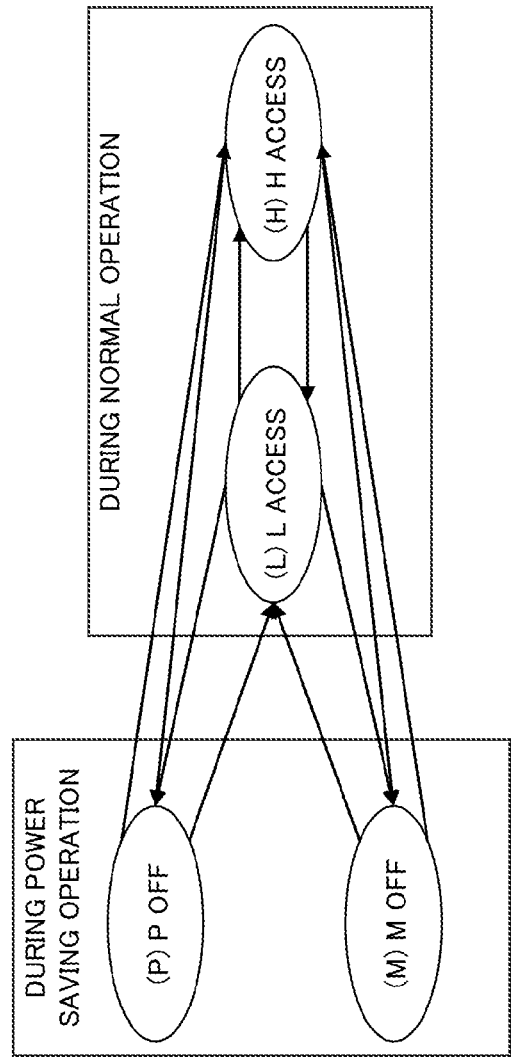
FIG. 5 is a diagram that illustrates transitions among power control modes in the storage apparatus as an example of the embodiment.

FIG. 5 is a diagram that illustrates transitions among power control modes in the storage apparatus 1 as an example of the embodiment.

As illustrated in FIG. 5, this storage apparatus 1 includes four power control modes including the P-off mode, the M-off mode, an L access mode, and an H access mode, and the ecological control unit 112 performs switching among such four power control modes.

The L access mode and the M access mode are executed during the normal operation, and the P-off mode and the M-off mode are executed during the energy-saving operation.

In the P-off mode (P), the supply of power to at least some constituent components such as a spindle motor, a control board, and the like included in the storage device 31 is stopped (power off: Power Off). The P-off mode may be referred to as a cold mode. In this P-off mode, the supply of power to the storage device 31 may be stopped.

In a case where the ecological control unit 112 selects the P-off mode, the storage control unit 113 controls stopping the supply of power to the storage device 31 or at least some constituent components such as a motor and a control board included in the storage device 31.

In the M-off mode (M), a spindle motor rotating the platter of the HDD is stopped (motor off: Motor Off).

In a case where the ecological control unit 112 selects the M-off mode, the storage control unit 113 executes control of stopping the spindle motor of the storage device 31.

In this storage apparatus 1, whether the P-off mode or the M-off mode is to be selected as the power control mode during the energy-saving operation may be selected by wither a user or the ecological control unit 112 to be described later.

Hereinafter, the setting of the power control mode (energy-saving operation mode) during the energy-saving operation that is executed by the user will be referred to as "user designation", and the setting thereof that is executed by the ecological control unit 112 will be referred to as "firmware designation".

Whether the energy-saving operation mode is selected by the user designation or the firmware designation is set in advance by the user using the management terminal 3. A result of this setting is stored in a memory region (for example, the cache region of the memory 106) that can be shared among the CMs 100 as a set value.

During the energy-saving operation (the P-off mode and the M-off mode), the storage device 31 is in a no-operation state, and accordingly, a failure or degeneration of a disk, a disk error, and the like are not detected.

In the H access mode (H), the spindle motor included in the storage device 31 is rotated (high-speed rotation) at a highest rotation speed (second rotation speed) set in the specification of the HDD (second state). In this H access mode, while a high-speed access to a storage region on the platter can be realized, the power consumption is high.

In this H access mode, the rotation speed is not limited to the highest rotation speed set in the specification of the HDD but may be a rotation speed higher than a predetermined threshold (first threshold).

In a case where the ecological control unit 112 selects the H access mode, the storage control unit 113 executes control of rotating the storage device 31, for example, at a highest rotation speed that is defined in advance.

The L access mode (L) becomes valid only for a case where the storage device 31 is a rotation speed-changeable HDD capable of changing the rotation speed of the spindle motor. In this L access mode, the spindle motor included in the storage device 31 is rotated (low-speed rotation) at a rotation speed (first rotation speed) that is lower than that of the H access mode (first rotation speed) (first state). For example, the spindle motor is rotated at a lowest rotation speed set in the product specification of the rotation speed-changeable HDD.

In this L access mode, the rotation speed is not limited to the lowest rotation speed set in the specification of the rotation speed-changeable HDD but may be a rotation speed that is a predetermined threshold (first threshold) or less.

In this L access mode, while the access to the storage region on the platter is delayed relative to that in the H access mode, the power consumption can be lowered than that in the H access mode. In addition, different from the P-off mode or the M-off mode, power is supplied to each unit configuring the storage device 31, and the storage device stands by in a state in which the platter is rotated, and accordingly, a data access of a speed higher than that in the P-off mode or the M-off mode can be realized. Hereinafter, the L access mode may be referred to as a ready mode.

In a case where the ecological control unit 112 selects the L access mode, the storage control unit 113 executes control of rotating the storage device 31, for example, at a lowest rotation speed that is defined in advance.

As illustrated in FIG. 5, while there is no transition between the M-off mode and the P-off mode, transitions among the P-off mode, the H-access mode, and the L-access mode occur. Similarly, transitions among the M-off mode, the H-access mode, and the L-access mode occur.

The ecological control unit 112 determines a power control mode of this storage apparatus 1. More specifically, the ecological control unit 112 determines a power control mode based on transition conditions defined in advance. In other words, the ecological control unit 112 performs switching between modes of the storage device 31.

(a) Mode Switching During Normal Operation

During the normal operation, a mode state change condition of the storage device 31 differs based on the validness/invalidness of the ecological mode and the presence/absence of the setting of the ecological schedule time period.

Hereinafter, the mode state change condition of the storage device 31 will be described for each of Cases 1 to 4 illustrated in FIG. 4.

[Case 1]

In Case 1 in which the ecological mode is invalid, a mission-critical operation weighting on the performance is executed. In other words, a state is formed in which an I/O access to the storage device 31 is constantly present, and the storage device 31 is operated basically in the H-access mode.

However, in a case where a state is formed in which no I/O access is present when an ecological monitoring operation is executed, the mode is switched to the L-access mode, and the storage device stands by in the L-access mode state until an I/O access is present.

[Case 2]

In Case 2 in which the ecological mode is valid, and there is no setting of the ecological schedule, a mission-critical operation is not executed. While a state in which an I/O access is constantly present is not formed, a system operation requiring performance of some degrees is executed, and it is requested to operate two factors of the power saving and the performance with good balance.

In a case where an I/O access is present, when the L access mode is operated in a state in which the storage load is high, the access performance is degraded to affect the business. Thus, switching between the H-access mode and the L-access mode is appropriately performed according to the load situation of the storage device 31. The load situation of the storage device 31, for example, is determined by using the number of commands (the command issuance number) issued from the host apparatus 2.

In a case where no I/O access is present, the storage device 31 is in the state of being operated not in the M-off mode or the P-off mode but in the L-access mode. The reason for this is as follows. In this Case 2, it is assumed that an I/O access is frequently present regardless of the time period, and thus, when the M-off mode or the P-off mode is set, it takes a time until the storage device 31 is operated, and the performance is influenced much thereby.

[Cases 3 and 4]

In Cases 3 and 4 in which the ecological mode is valid, and the ecological schedule is set, a state is assumed in which no I/O access is present basically in the ecological schedule time period set by the user, and a system operation weighting more on the power saving than on the performance is executed. In other words, switching from the energy-saving operation is performed.

When an I/O access is present in the ecological schedule time period, the storage device 31 is operated in the L-access mode, and, when a state is formed in which no I/O access is present, the mode is switched to the energy-saving operation mode. At a time other than the ecological schedule time, an operation similar to that of Case 2 described above is executed.

FIG. 6 is a diagram that illustrates conditions for transitions among power control modes in the storage apparatus 1 as an example of the embodiment.

In FIG. 6, transitions among the power control modes are represented as 16 kinds of patterns, and a condition for the transition of the power-saving control mode is represented for each of the patterns.

In FIG. 6, the P-off mode, the M-off mode, the L-access mode, and the H-access mode are respectively represented using signs (P), (M), (L), and (H). Hereinafter, "during being the energy-saving operation" may be represented as during ECO.

In FIG. 6, description of "- - - - -" included in the "transition condition" represents no transition condition, in other words, no occurrence of a transition between power control modes.

The ecological control unit 112 performs switching between the power control modes of the storage device 31 in accordance with the transition conditions illustrated in FIG. 6.

In the switching between power control modes illustrated below, switching from the L-access mode and switching to the L-access mode is performed only for a rotation speed-changeable HDD.

(1) Transition Pattern 1

During the energy-saving operation (during ECO), in a state in which a storage access does not occur during the operation in the P-off mode, the P-off mode is continued.

(2) Transition Pattern 2

Switching from the P-off mode to the M-off mode is not performed.

(3) Transition Pattern 3

During the energy-saving operation, in a case where a storage access occurs during the operation in the P-off mode, switching from the P-off mode to the L-access mode is performed.

In the storage device 31, when the platter that is in a stop state is suddenly rotated at a high speed, a load is applied to the spindle motor and components neighboring to the spindle motor such as a control circuit in the storage device 31. Thus, in order to reduce the load of the storage device 31, basically, switching from the P-off mode to the L-access mode is performed.

(4) Transition Pattern 4

During the energy-saving operation, in a case where the following three Conditions (a), (b), and (c) are satisfied, switching from the P-off mode to the H-access mode is performed.

Condition (a): Occurrence of a storage access during the operation in the P-off mode Condition (b): The load (storage load) state of the storage device 31 is higher than a reference value. Here, for example, the load state of the storage device 31 is determined based on the issuance number of I/O commands (hereinafter, simply referred to as a command issuance number) issued to the storage device 31. In a case where this command issuance number is a predetermined threshold or more, the load state of the storage device 31 is determined to be higher than the reference value.

As the threshold (reference value) of the command issuance number, for example, a predetermined percentage (for example, 90%) of a maximum value (command issuance upper limit number: MAX value) of the number of commands that can be received as the storage device, which is set in the device specification, may be used.

Condition (c): The storage device 31 is not a rotation speed-changeable HDD.

In a state in which the command issuance number is close to the MAX value, there is concern that a response time for the user may be out of an allowed range, and accordingly, it is preferable that the storage device 31 is operated at a highest performance speed according to the H-access mode.

(5) Transition Pattern 5

Switching from the M-off mode to the P-off mode is not performed.

Since there is a high possibility that a storage access occurs during the energy-saving operation, the M-off mode state is maintained.

(6) Transition Pattern 6

During the energy-saving operation (during ECO), in a state in which a storage access does not occur during the operation in the M-off mode, the M-off mode is continued.

(7) Transition Pattern 7

During the energy-saving operation (during ECO), in a case where a storage access occurs during the operation in the M-off mode, switching from the M-off mode to the L-access mode is performed.

In the storage device 31, when the platter that is in a stop state is suddenly rotated at a high speed, a load is applied to the spindle motor and components neighboring to the spindle motor such as a control circuit in the storage device 31. Thus, in order to reduce the load of the storage device 31, basically, switching from the P-off mode to the L-access mode is performed.

(8) Transition Pattern 8

During the energy-saving operation, in a case where the following three Conditions (a), (b), and (c) are satisfied, switching from the M-off mode to the H-access mode is performed.

Condition (a): Occurrence of a storage access during the operation in the M-off mode Condition (b): The load state of the storage device 31 is higher than a reference value. For example, the command issuance number for the storage device 31 is 90% of the command issuance upper limit number (MAX value) or more.

Condition (c): The storage device 31 is not a rotation speed-changeable HDD.

In a state in which the command issuance number is close to the MAX value, there is concern that a response time for the user may be out of an allowed range, and accordingly, it is preferable that the storage device 31 is operated at a highest performance speed according to the H-access mode.

(9) Transition Pattern 9

The ecological control unit 112 has a function for counting the storage access number of times during the power-saving operation (during ECO). In a case where a storage access to the storage device 31 occurs during the energy-saving operation (during ECO), the ecological control unit 112 counts up a count value used for determining mode switching. This count value used for determining mode switching, for example, is stored in a memory region (for example, the cache region of the memory 106) that can be shared among the CMs 100.

During the energy-saving operation (during ECO), in a case where the storage access number of times (the count value used for determining the mode switching: predetermined threshold) is once or less, switching from the L-access mode to the P-off mode is performed.

(10) Transition Pattern 10

During the energy-saving operation (during ECO), in a case where the storage access number of times (the count value used for determining the mode switching: predetermined threshold) is twice or more, switching from the L-access mode to the M-off mode is performed.

Since there is concern that a storage access occurs during the energy-saving operation, switching to the M-off mode is performed. The reason for this is that the storage device can be operated in a shorter time in the M-off mode than in the P-off mode.

(11) Transition Pattern 11

In a case where the following three Conditions (a), (b), and (c) are satisfied, the L-access mode is continued.

Condition (a): Occurrence of a storage access during the energy-saving operation Condition (b): A storage access is only for formatting the storage device 31. The formatting of the storage device 31, for example, is performed at the time of setting a logical volume or the like.

Condition (c): There is no storage access during the release of the energy-saving operation, in other words, during the normal operation.

The reason for this is that, even in a case where the energy-saving operation is released, in a state in which there is no storage access, by setting the L-access mode, power saving can be achieved.

In addition, in a case where the disk access is only for formatting, regardless of being in the middle of the energy-saving operation, when the storage device 31 is checked to be a rotation speed-changeable HDD, the L access mode is set (see step C6, which will be described later, illustrated in FIG. 10).

A determination of whether a disk access is an access only for formatting at the time of the disk access can be realized by using a known technique.

(12) Transition Pattern 12

In a case where the storage device 31 is a rotation speed-changeable HDD, in a case where the following two conditions (a) and (b) are satisfied, switching from the L-access mode to the H-access mode is performed.

Condition (a): The load (storage load) state of the storage device 31 is higher than a reference value. For example, the command issuance number for the storage device 31 is 90% of the command issuance upper limit number (MAX value) or more.

Condition (b): A storage access other than a storage access for formatting occurs during the release of the energy-saving operation, in other words, during the normal operation.

(13) Transition Pattern 13

During the energy-saving operation (during ECO), in a case where the storage access number of times (the count value used for determining the mode switching: predetermined threshold) is once or less, switching from the H-access mode to the P-off mode is performed.

(14) Transition Pattern 14

During the energy-saving operation (during ECO), in a case where the storage access number of times (the count value used for determining the mode switching: predetermined threshold) is twice or more, switching from the H-access mode to the M-off mode is performed.

Since there is concern that a storage access occurs during the energy-saving operation, switching to the M-off mode is performed. The reason for this is that the disk can be operated in a shorter time in the M-off mode than in the P-off mode.

(15) Transition Pattern 15

There is no storage access during the release of the energy-saving operation, in other words, during the normal operation. Alternatively, even when there is a storage access, in a case where only the storage access for formatting the storage device 31 occurs, switching from the H-access mode to the L-access mode is performed.

The reason for this is that, in a case where the H-access mode is maintained in a state in which there is no storage access, the amount of power consumption becomes high, and power saving cannot be achieved, and thus, the switching to the L-access mode is performed.

(16) Transition Pattern 16

In a state in which a storage access occurs, the L-off mode is continued.

The ecological control unit 112 executes power control of the storage device 31 by using the ecological information 162.

FIG. 7 is an exemplary diagram that illustrates the ecological information 162 in the storage apparatus 1 as an example of the embodiment.

In the example illustrated in FIG. 7, the ecological information 162 includes "Func", "Time", "Mode", and "Mode_change_cnt" as information (member names) to be managed, and such information is configured to be associated with each other. This ecological information 162 is stored in a memory region (for example, the cache region of the memory 106) that can be shared among the CMs 100.

"Func" represents whether the ecological mode is valid or invalid. For example, "0" in a case where the ecological mode is invalid and "1" in a case where the ecological mode is valid is registered as this "Func".

"Time" represents a period of the ecological time in which energy-saving operation is executed. More specifically, as this Time, start time and end time of the energy-saving operation are registered. This Time is used in a case where the ecological schedule is valid.

"Mode[XX]" represents the power control mode of each storage device 31. For example, "1" represents the P-off mode, "2" represents the M-off mode, "3" represents the L-access mode, and "4" represents the H-access mode. Here, "3" (the L-access mode) is set only to a storage device 31 that is checked to be a rotation speed-changeable HDD.

"XX" is identification information used for specifying the storage device 31 included in this storage apparatus 1. In other words, Mode[XX] is included for each storage device 31.

For example, in a case where "3" is registered in Mode [01], it represents that the storage device 31 specified by [01] is in the L-access mode.

"Mode_change_cnt[XX]" represents the number of times of changing the power control mode during the energy-saving operation for each storage device 31. Here, XX is identification information used for specifying the storage device 31 included in this storage apparatus 1. In other words, "Mode_change_cnt[XX]" is included for each storage device 31.

For example, in a case where "5" is registered in Mode_change_cnt [01], it represents that switching between the power control modes has been performed five times during the power-saving operation of the storage device 31 specified by [01].

The value of Mode_change_cnt[XX] is reset to zero (initialized) when the period of the ecological time ends.

The ecological control unit 112 checks "Func" of the ecological information 162 and determines that the ecological mode is valid in a case where "1" is registered.

In a case where the ecological mode is valid, in a case where the period of the ecological time is registered in "Time" of the ecological information 162, the ecological control unit 112 starts an energy-saving operation when it is the start time registered in this "Time". In addition, when it is the end time registered in "Time", the ecological control unit 112 ends the energy-saving operation.

In addition, the ecological control unit 112 executes power control for the storage device 31 set as the HS. In a case where the HS is checked to be a rotation speed-changeable HDD, the ecological control unit 112 sets this HS to be in the L-access mode. In other words, the HS is caused to stand by in the L-access mode.

As described above, in the L-access mode, the platter of the storage device 31 is caused to stand by in a rotating state at a low speed. Thus, when data of the failed storage device 31 is rebuilt through rebuilding, sufficient data access performance can be realized, and the power consumption of the HS can be reduced.

The ecological control unit 112 sets an unused storage device 31 other than the HS to be in the P-off mode (cold mode) state (cold standby). Accordingly, the power consumption of the unused storage device 31 is reduced.

The HS setting process is executed in a case (to be described later with reference to FIG. 10) where generating/formatting a LUN is started and a case (to be described later with reference to FIG. 12) where rebuild toward the HS is started.

(B) Operation

Figure 8:
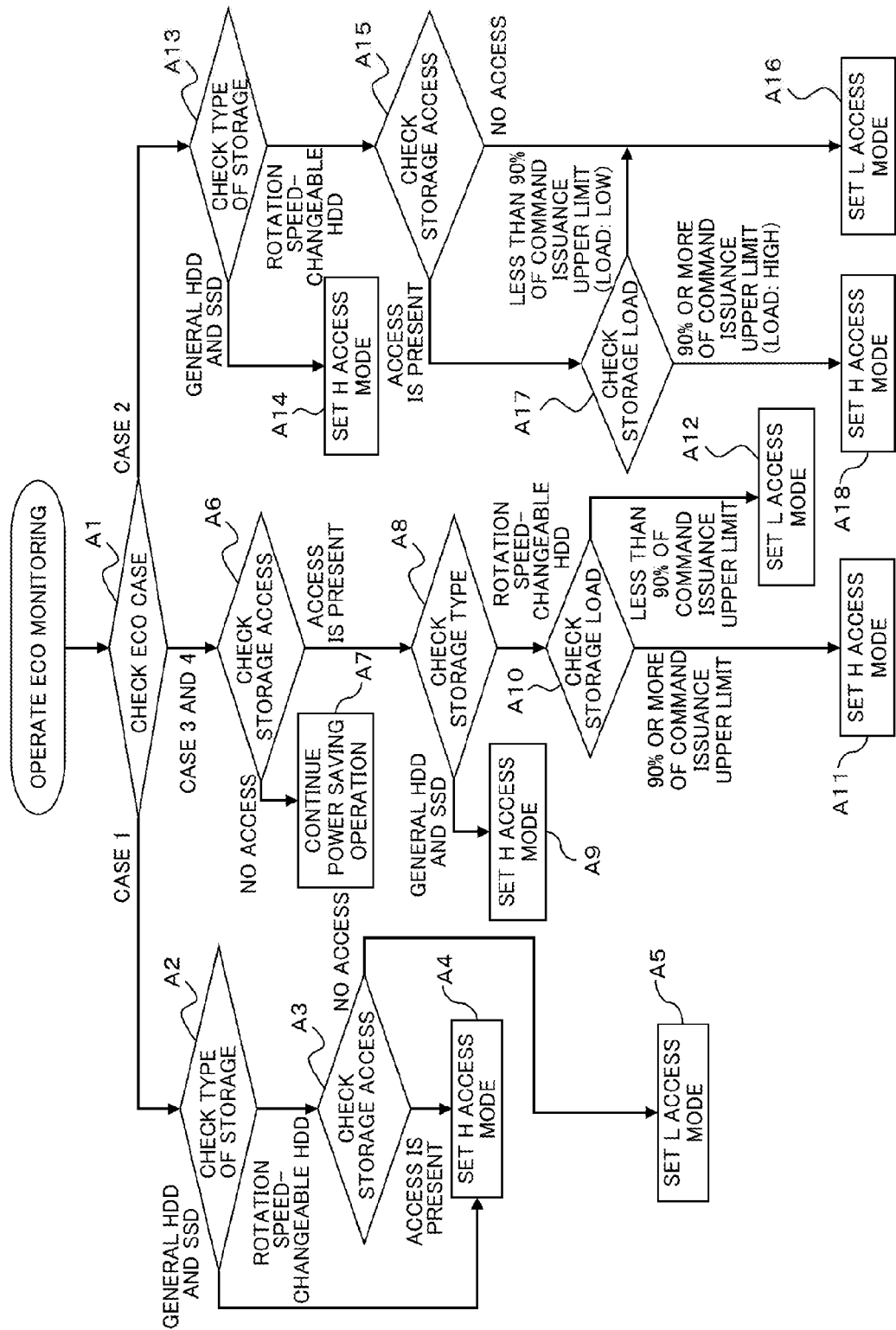
FIG. 8 is a flowchart that illustrates a power control mode switching process executed by an ecological control unit during a normal operation of a storage apparatus as an example of an embodiment.

The power control mode switching process executed by the ecological control unit 112 during the normal operation of the storage apparatus 1 as an example of the embodiment configured as described above will be described with reference to a flowchart (steps A1 to A18) illustrated in FIG. 8.

This process is executed for each storage device 31, and, during the normal operation, monitoring (ecological monitoring) of the storage device 31 that is executed by the ecological control unit 112 is operated.

In step A1, the ecological control unit 112 checks an ecological case by referring to the ecological information 162. In other words, the ecological control unit 112 checks one of Cases 1 to 4 illustrated in FIG. 4 to which the ecological case corresponds by referring to "Func" and "Time" of the ecological information 162.

As a result of the checking process, in a case where the ecological case is Case 1 (see the route of "Case 1" of step A1), the ecological control unit 112 checks a storage type by referring to the storage information 163 for the target storage device 31 in step A2. As a result of the checking process, in a case where the storage type is a rotation speed-changeable HDD (see the route of the "rotation speed-changeable HDD" of step A2), the process proceeds to step A3.

In step A3, the ecological control unit 112 checks whether or not a storage access to the storage device 31 occurs. Whether or not a storage access to the storage device 31 occurs can be determined by using various known techniques, and the description thereof will not be presented.

In a case where a storage access to the target storage device 31 occurs (see the route of "access being present" in step A3), the H-access mode is set to the storage device 31 in step A4. Also in a case where the storage type is not a rotation speed-changeable HDD but a normal HDD or SSD (see the route of "normal HDD or SSD" of step A2) as a result of the checking process of step A2, the H-access mode is set to the storage device 31 in step A4.

On the other hand, in a case where a storage access to the target storage device 31 does not occur (see the route of "no access" of step A3), the L-access mode is set to the storage device 31 in step A5.

In a case where the ecological case is Case 3 or Case 4 (see the route of "Cases 3 or 4" of step A1) as a result of the checking process of step A1, the ecological control unit 112 checks whether or not a storage access to the storage device 31 occurs in step A6.

In a case where a storage access to the target storage device 31 does not occur (see the route of "no access" of step A6), the energy-saving operation is continued in step A7.

On the other hand, in a case where a storage access to the target storage device 31 occurs (see the route of "access being present" of step A6), the storage type is checked by referring to "Type" of the storage information 163 for the target storage device 31 in step A8.

In a case where the storage type is not a rotation speed-changeable HDD but a normal HDD or SSD as a result of the checking process (see the route of "normal HDD or SSD" of step A8), the ecological control unit 112 sets the H-access mode to the storage device 31 in step A9.

On the other hand, in a case where the storage type is a rotation speed-changeable HDD as a result of the checking process of step A8 (see the route of "rotation speed-changeable HDD" of step A8), the process proceeds to step A10.

In step A10, the ecological control unit 112 checks the load (storage load) of the target storage device 31.

In a case where the command issuance number for the storage device 31, for example, is 90% of the command issuance upper limit number or more as a result of the checking process (see the route of "90% of the command issuance upper limit number or more" of step A10), the ecological control unit 112 sets the H-access mode to the storage device 31 in step A11.

On the other hand, in a case where the command issuance number for the storage device 31 is less than 90% of the command issuance upper limit number as a result of the checking process (see the route of "less than 90% of the command issuance upper limit number" of step A10), the ecological control unit 112 sets the L-access mode to the storage device 31 in step A12.

As a result of the checking process of step A1, in a case where the ecological case is Case 2 (see the route of "Case 2" of step A1), the ecological control unit 112 checks a storage type by referring to the storage information 163 for the target storage device 31 in step A13.

In a case where the storage type is not a rotation speed-changeable HDD but a normal HDD or SSD (see the route of "normal HDD or SSD" of step A13) as a result of the checking process, the ecological control unit 112 set the H-access mode to the storage device 31 in step A14.

On the other hand, as a result of the checking process of step A13, in a case where the storage type is a rotation speed-changeable HDD (see the route of the "rotation speed-changeable HDD" of step A13), the process proceeds to step A15.

In step A15, the ecological control unit 112 checks whether or not a storage access to the storage device 31 occurs.

In a case where a storage access to the target storage device 31 does not occur (see the route of "no access" of step A15), the ecological control unit 112 sets the L-access mode to the storage device 31 in step A16.

On the other hand, in a case where a storage access to the target storage device 31 occurs (see the route of "access being present" of step A15), the ecological control unit 112 checks the load (storage load) of the target storage device 31 in step A17.

In a case where the command issuance number for the storage device 31, for example, is 90% of the command issuance upper limit number or more as a result of the checking process (see the route of "90% of the command issuance upper limit number or more" of step A17), the ecological control unit 112 sets the H-access mode to the storage device 31 in step A18.

On the other hand, in a case where the command issuance number for the storage device 31 is less than 90% of the command issuance upper limit number as a result of the checking process (see the route of "less than 90% of the command issuance upper limit number" of step A17), the ecological control unit 112 sets the L-access mode to the storage device 31 in step A16.

Figure 9:
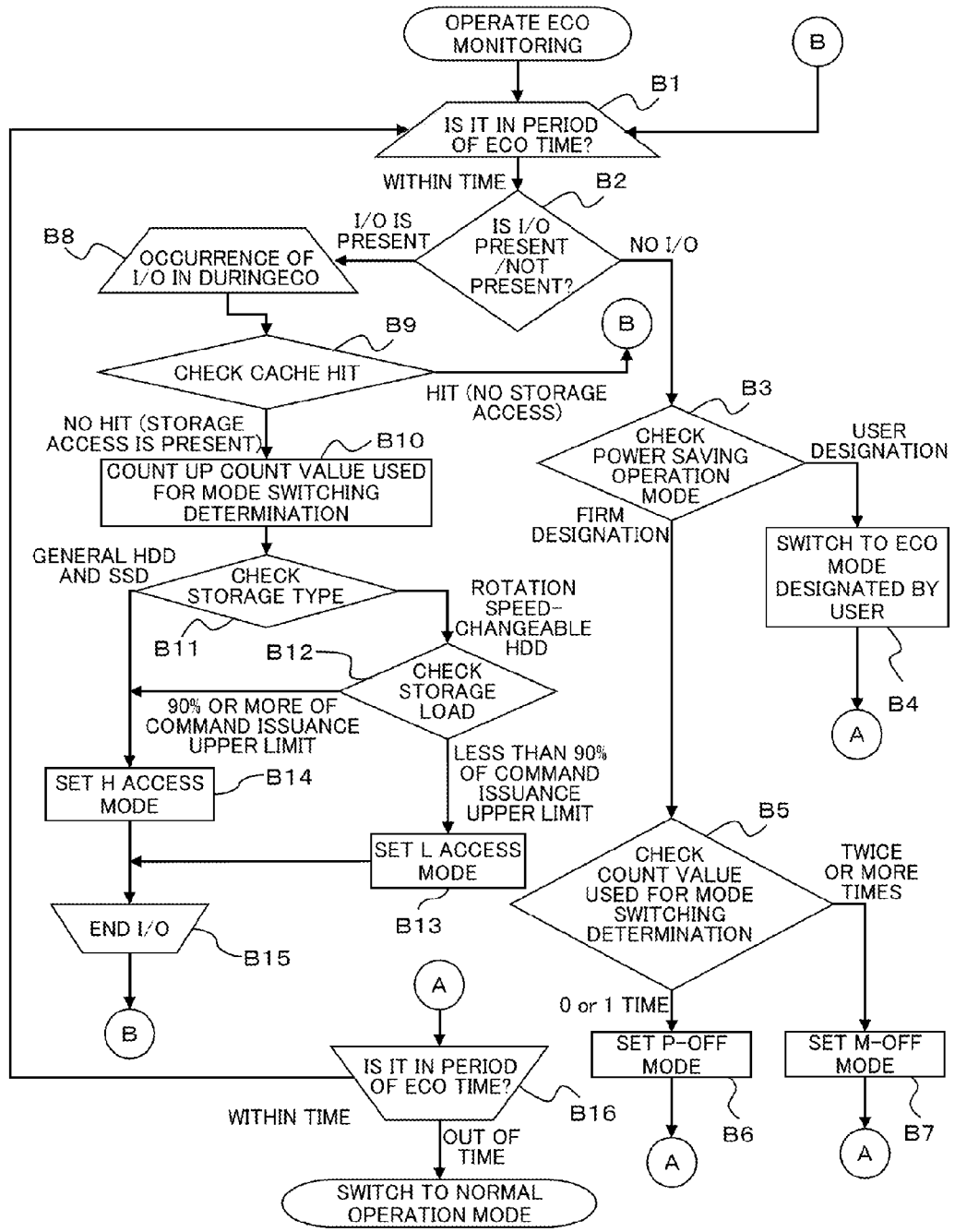
FIG. 9 is a flowchart that illustrates a power control mode switching process executed by the ecological control unit during an energy-saving operation of a storage apparatus as an example of an embodiment.

Next, a power control mode switching process executed by the ecological control unit 112 during the energy-saving operation of the storage apparatus 1 as an example of the embodiment configured as described above will be described with reference to a flowchart (steps B1 to B16) illustrated in FIG. 9.

This process is executed for each storage device 31, and, during the energy-saving operation, monitoring (ecological monitoring) for the storage device 31 that is executed by the ecological control unit 112 is operated.

In step B1, the ecological control unit 112 checks whether or not it is in the period of the ecological time set by the ecological schedule by referring to "Time" of the ecological information 162. In a case where it is in the period of the ecological time, a looping process of repeatedly executing control up to step B16 is started.

In step B16, a loop end process corresponding to step B1 is executed. In a case where it is in the period of the ecological time, the process is returned to step B1, and the looping process is executed. On the other hand, in a case where it is out of the period of the ecological time, the process ends and transits to the normal operation (see Case 2).

In step B2, the ecological control unit 112 checks whether or not a storage access (I/O) to the storage device 31 occurs.

In a case where a storage access to the target storage device 31 does not occur (see the route of "No I/O" of step B2), the process proceeds to step B3.

In step B3, the ecological control unit 112 checks the energy-saving operation mode. As a result of the checking process, in case of the user designation (see the route of "user designation" of step B3), the process proceeds to step B4. In step B4, the ecological control unit 112 sets an energy-saving operation mode designated by the user, in other words, the M-off mode or the P-off mode, and the process proceeds to step B16 (see reference sign A illustrated in FIG. 9).

On the other hand, as a result of the checking process of step B3, in case of the firmware designation (see the route of "firmware designation" of step B3), the process proceeds to step B5. In step B5, the ecological control unit 112 checks the count value used for determining the mode switching. As a result of the checking process, in a case where the count value used for determining the mode switching is two or less (see the route of "0 or 1 time" of step B5), the ecological control unit 112 sets the P-off mode to the storage device 31 in step B6. Thereafter, the process proceeds to step B16 (see reference sign A of FIG. 9).

As a result of the checking process, in a case where the count value used for determining the mode switching is two or more (see the route of "twice or more times" of step B5), the ecological control unit 112 sets the M-off mode to the storage device 31 in step B7. Thereafter, the process proceeds to step B16 (see reference sign A of FIG. 9).

On the other hand, as a result of the checking process of step B2, in a case where a storage access to the target storage device 31 occurs (see the route of "presence of I/O" of step B2), the process proceeds to step B8.

In step B8, while an I/O occurs during the energy-saving operation, the ecological control unit 112 starts a looping process of repeatedly executing control up to step B15.

In step B15, a loop end process corresponding to step B8 is executed. While an I/O is issued, the process is returned to step B8, and the looping process is executed. On the other hand, in a case where the I/O ends, the process ends, and the process proceeds to step B1 (see reference sign B of FIG. 9).

In step B9, the ecological control unit 112 checks whether or not a cache hit occurs in the storage cache for an issued I/O request (for example, a read request). In a case where the cache hits, and a storage access is not made (see the route of a "hit" of step B9), the process is returned to step B1 (see reference sign B illustrated in FIG. 9).

On other hand, as a result of the checking process of step B9, in a case where a cache hit does not occur, in other words, in a case where a storage access occurs (see the route of "no hit" of step B9), the process proceeds to step B10.

In step B10, the ecological control unit 112 counts up the count value used for determining mode switching. In addition, in step B11, the ecological control unit 112 checks the storage type of the target storage device 31 by referring to "Type" of the storage information 163.

In a case where the storage type is not a rotation speed-changeable HDD but a normal HDD or SSD as a result of the checking process (see the route of "normal HDD or SSD" of step B11), the process proceeds to step B14.

In step B14, after setting the H-access mode to the storage device 31, the ecological control unit 112 proceeds to step B15.

On the other hand, in a case where the storage type is a rotation speed-changeable HDD as a result of the checking process of step B11 (see the route of "rotation speed-changeable HDD" of step B11), the process proceeds to step B12.

In step B12, the ecological control unit 112 checks the load (storage load) of the target storage device 31.

In a case where the command issuance number for the storage device 31, for example, is 90% of the command issuance upper limit number or more as a result of the checking process (see the route of "90% of the command issuance upper limit number or more" of step B12), the process proceeds to step B14.

In step B14, after setting the H-access mode to the storage device 31, the ecological control unit 112 proceeds to step B15.

On the other hand, in a case where the command issuance number for the storage device 31 is less than 90% of the command issuance upper limit number as a result of the checking process (see the route of "less than 90% of the command issuance upper limit number" of step B12), the process proceeds to step B13.

In step B13, after setting the L-access mode to the storage device 31, the ecological control unit 112 proceeds to step B15.

Next, an HS setting process after the generation of a RAID in the storage apparatus 1 as an example of the embodiment configured as described above will be described according to a flowchart (steps C1 to C7) illustrated in FIG. 10 with reference to FIG. 11.

FIG. 11 is an exemplary diagram that illustrates transitions among states of the storage devices 31 in this storage apparatus 1. In the example illustrated in FIG. 11, for five storage devices 31 (storages [0], [1], [2], [3], and [5]) specified using identification information 0 to identification information 3 and identification information 5, transitions among Usages of the storage information 163 of each storage device 31 and Modes of the ecological information 162 are illustrated. Hereinafter, for each part having no description such as a numerical value or the like in FIG. 11, it is assumed that no state transition occurs.

In the example illustrated in FIG. 11, an example of realizing a RAID1 (mirroring) using the storage devices 31 is illustrated. Each storage device 31 is one of an SSD, an FC disk drive (FC—1500 rpm—HDD) of which the rotation speed is fixed to 1,500 rpm, a rotation speed-changeable HDD, and a SATA disk drive.

As illustrated in FIG. 11, in the initial state, "0 (unused)" is set to "Usage" of each storage device 31, and "1" (P-off mode) is set to "Mode" thereof.

The RAID control unit 111 configures the RAID1 by using the storage [0] and the storage [1]. Accordingly, the storage control unit 113, as illustrated in an item (1) illustrated in FIG. 11, in the storage information 163, "2 (using a RAID)" is set to "Usage" of each of the storage [0] and the storage [1].

In this example, all the storages [0 to 3 and 5] are assumed to be rotation speed-changeable HDDs. The ecological control unit 112, as represented in the item (1) illustrated in FIG. 11, changes the storages [0 to 3] to be in the L-access mode.

In step C1, the RAID control unit 111 generates a LUN of the generated RAID (RAID1) and formats the storages [0 and 1] to be used.

In step C2, the storage control unit 113 checks whether or not an HS of the same storage type (the rotation speed-changeable HDD) as that of the storage device 31 configuring the RAID is present by referring to the storage information 163. As a result of the checking process, in a case where an HS of the same type as that of the storage device 31 configuring the RAID is present (see the route of "presence of the HS" of step C2), the process ends.

On the other hand, as a result of the checking process, in a case where an HS of the same type as that of the storage device 31 configuring the RAID is not present (see the route of "HS not present" of step C2), the process proceeds to step C3. In step C3, the storage control unit 113 checks whether or not an unused storage device 31 of the same type (the rotation speed-changeable HDD) as that of the storage device 31 configuring the RAID is present by referring to the storage information 163.

As a result of the checking process, in a case where an unused storage device 31 of the same type as that of the storage device 31 configuring the RAID is not present (see the route of "not present" of step C3), the process ends. On the other hand, in a case where an unused storage device 31 of the same type as that of the storage device 31 configuring the RAID is present (see the route of "presence" of step C3), the process proceeds to step C4. Here, as described above, the storage [5] is assumed to be a rotation speed-changeable HDD.

In the process of steps C2 and C3 described above, any state transition does not occur in the storages [0], [1], [2], [3], and [5] (see items (2) to (5) illustrated in FIG. 11).

In step C4, the storage control unit 113 registers the unused storage device 31 of the same type as that of the storage devices 31 configuring the RAID in the HS. In other words, the storage control unit 113, as represented in an item (6) illustrated in FIG. 11, sets "1" to "Usage" of the storage [5] in the storage information 163.

Here, in a case where a plurality of unused storage devices 31 of the same type as that of the storage device 31 configuring the RAID are present, the storage control unit 113 selects a storage device 31 used as an HS among the plurality of storage devices 31 in accordance with priority levels set in advance. For example, the storage control unit 113 selects a storage device 31 having a lowest (smallest) management number or the like set in advance among the plurality of unused storage devices 31 of the same type as an HS.

In step C5, the ecological control unit 112 checks the storage type of the selected HS. As a result of the checking process, in a case where the selected HS (storage [5]) is a rotation speed-changeable HDD (see the route of "rotation speed-changeable HDD" of step C5), the process proceeds to step C6. In other words, in step C6, as represented in an item (6) illustrated in FIG. 11, the ecological control unit 112 sets the L-access mode to the HS (storage [5]). In other words, the HS that is the rotation speed-changeable HDD is caused to stand by in the ready mode. In addition, the ecological control unit 112 sets the P-off mode (cold mode) to the other unused storage device 31 not set in the HS.

On the other hand, in a case where the storage type of the selected HS (storage [5]) is not a rotation speed-changeable HDD but a normal HDD or SSD (see the route of "normal HDD or SSD" of step C5) as a result of the checking process, the process proceeds to step C7. In other words, in step C7, the ecological control unit 112 sets the H-access mode to the HS (storage [5]). Thereafter, the process ends.

Thereafter, even when RAID configured by rotation speed-changeable HDDs and a LUN are generated, unused remaining rotation speed-changeable HDDs are not registered as HS's. In this process, while an example in which the storages [0 to 3 and 5] are rotation speed-changeable HDDs has been illustrated, for storage devices 31 of another type, a process similar thereto is executed when a LUN is generated after the generation of a RAID. However, the H-access mode instead of the L-access mode is set to storage devices 31 other than the rotation speed-changeable HDDs.

Figure 10:
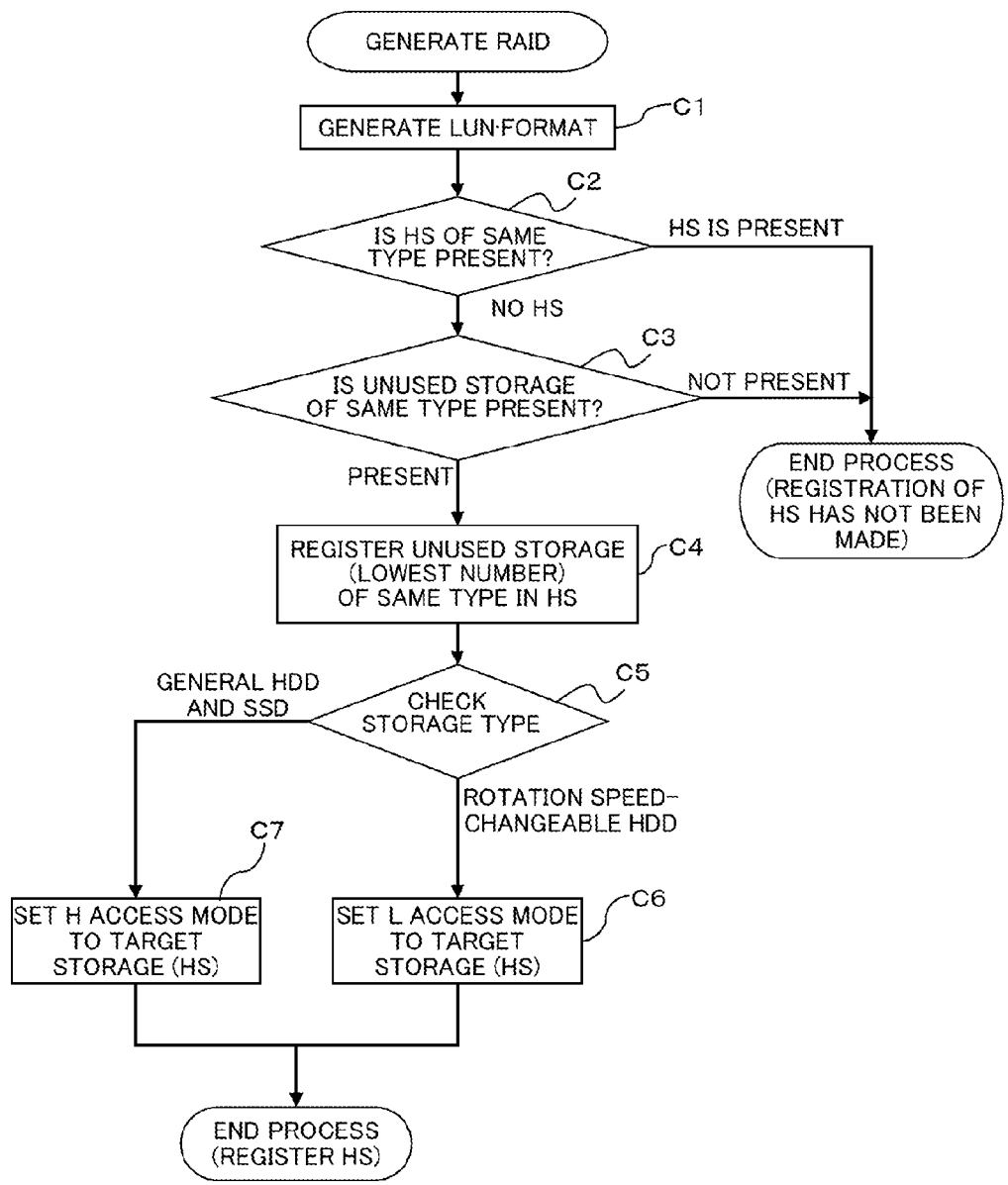
FIG. 10 is a flowchart that illustrates an HS setting process after generation of a RAID in a storage apparatus as an example of an embodiment.

For the process illustrated in FIG. 10, while an example has been illustrated in which the RAID is formed by the storage devices 31 of the same storage type, in a case where a RAID is configured by storage devices 31 of mutually-different storage types, the process of step C2 and subsequent steps is executed for each storage type.

Figure 12:
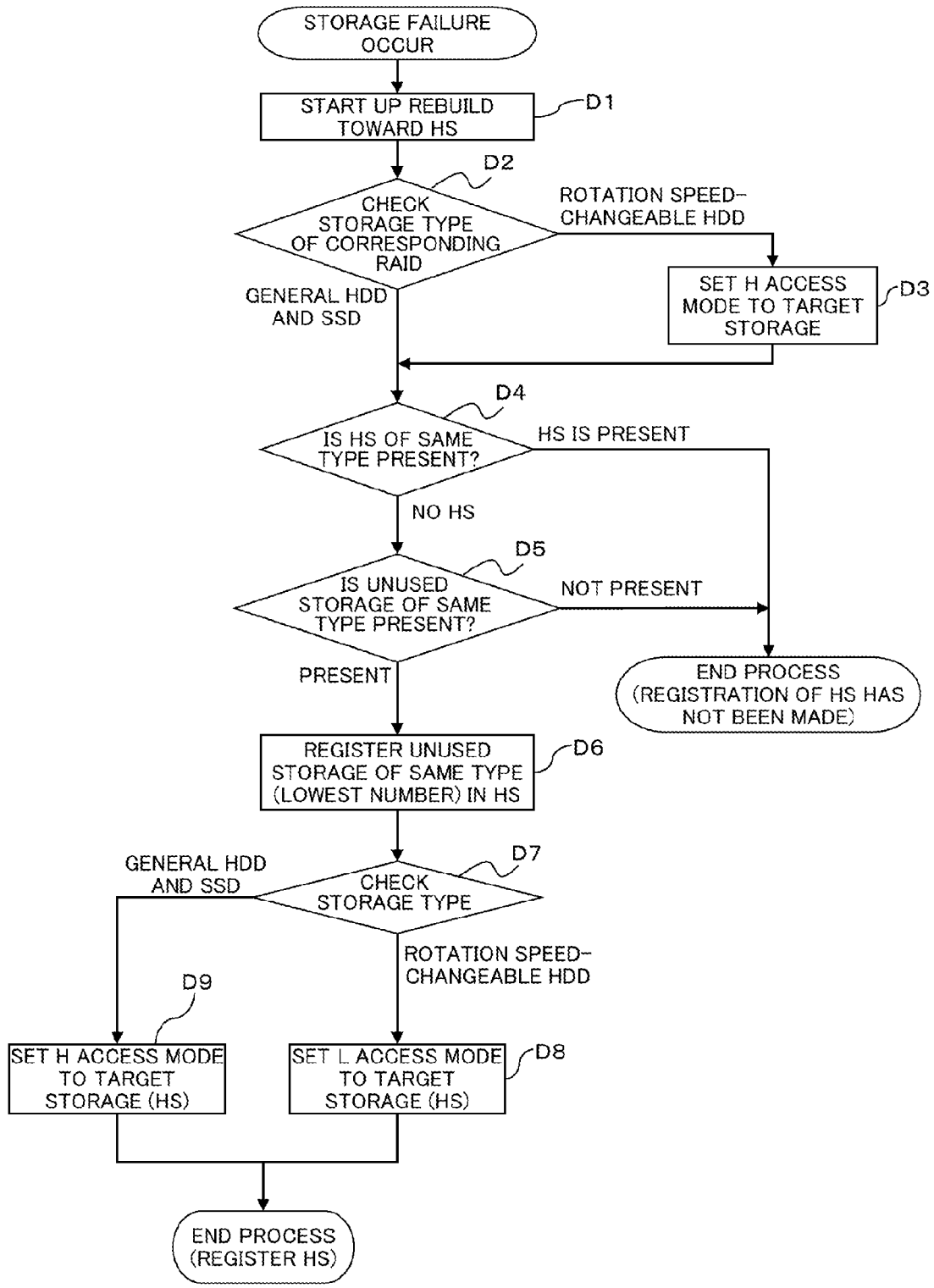
FIG. 12 is a flowchart that illustrates an HS setting process executed when a failure occurs in a storage device of a storage apparatus as an example of an embodiment.

Next, an HS setting process at the time of an occurrence of a failure of the storage device 31 in the storage apparatus 1 as an example of the embodiment configured as described above will be described according to a flowchart (steps D1 to D9) illustrated in FIG. 12 with reference to FIG. 13. FIG. 13 is an exemplary diagram that illustrates transitions among states of storage devices 31 of the storage apparatus 1.

In the example illustrated in FIG. 13, for six storage devices 31 (storages [0], [1], [2], [3], [5], and [6]) specified using identification information 0 to identification information 3, identification information 5, and identification information 6, transitions among Usages of the storage information 163 of each storage device 31 and Modes of the ecological information 162 are illustrated. Hereinafter, for each part having no description such as a numerical value or the like in FIG. 13, it is assumed that no state transition occurs.

A RAID is configured by storage devices 31 of the same storage type, and, in this example, all the storages [0 to 3, 5, and 6] are assumed to be rotation speed-changeable HDDs.

In the example illustrated in FIG. 13, as illustrated in an initial state field, a RAID1 (mirroring) is configured by the storage [0] and the storage [1]. The storage [5] is registered as an HS, and the storage [6] is in an unused state.

The storages [0 to 3] are in the state of one of the L-access mode and the H-access mode. In addition, the storage [5] that is an HS is in the L-access mode, and the unused storage [6] is the P-off mode.

In such a state, an example will be described in which, as illustrated in a Status field, the storage [1] fails, and rebuild is executed using the storage [5] that is an HS.

When the rebuild is operated, the HS that is registered as the same storage type as that failed storage device 31 is used, and accordingly, it is necessary to newly register an HS from among unused storage devices 31.

In step D1, a rebuild process is operated, and the storage control unit 113 changes "Usage" of the storage information 163 for the storage [5] from "1 (HS)" to "2 (configured as a RAID)" (see an item (2) illustrated in FIG. 13)

In step D2, the ecological control unit 112 checks the storage type of the storage devices 31 configuring the RAID in which a failure occurs. As a result of the checking process, in a case where the storage devices 31 are rotation speed-changeable HDDs (see the route of "rotation speed-changeable HDD" of step D2), in step D3, the ecological control unit 112 switches all such storage devices 31 to the H-access mode (see an item (3) illustrated in FIG. 13). The reason for this is that, the RAID during the rebuilding process is in a state having no redundancy, and, in order to recover data as soon as possible, highest disk access performance is exerted. Thereafter, the process proceeds to step D4.

As a result of the checking process of step D2, in a case where the storage type of the storage devices 31 configuring the RAID are not rotation speed-changeable HDDs but normal HDDs or SSDs (see the route of "normal HDD or SSD" of step D2), the process proceeds to step D4.

In step D4, the storage control unit 113 checks whether or not an HS of the same storage type (rotation speed-changeable HDD) as that of the storage devices 31 configuring the RAID is present by referring to the storage information 163. As a result of the checking process, in a case where an HS of the same type as that of the storage devices 31 configuring the RAID is present (see the route of "presence of the HS" of step D4), the process ends.

On the other hand, as a result of the checking process, in a case where an HS of the same type as that of the storage devices 31 configuring the RAID is not present (see the route of "HS not present" of step D4), the process proceeds to step D5. In step D5, the storage control unit 113 checks whether or not an unused storage device 31 of the same type as that of the storage devices 31 configuring the RAID is present by referring to the storage information 163.

As a result of the checking process, in a case where an unused storage device 31 of the same type as that of the storage devices 31 configuring the RAID is not present (see the route of "Not present" of step D5), the process ends. On the other hand, in a case where an unused storage device 31 of the same type as that of the storage devices 31 configuring the RAID is present (see the route of "Present" of step D5), the process proceeds to step D6. Here, as described above, it is assumed that the storage [6] is of the same storage type as that of the storage devices 31 configuring the RAID.

In the process of steps D4 and D5 described above, any state transition does not occur in the storages [0 to 3], [5], and [6] (see items (4) to (5) illustrated in FIG. 13).

In step D6, the storage control unit 113 registers the unused storage device 31 of the same type as that of the storage devices 31 configuring the RAID in the HS. In other words, the storage control unit 113, as represented in an item (6) illustrated in FIG. 13, sets "1 (HS)" to "Usage" of the storage [6] in the storage information 163.

Here, in a case where a plurality of unused storage devices 31 of the same type as that of the storage device 31 configuring the RAID are present, the storage control unit 113 selects a storage device 31 used as an HS among the plurality of storage devices 31 in accordance with priority levels set in advance. For example, the storage control unit 113 selects a storage device 31 having a lowest (smallest) management number or the like set in advance among the plurality of unused storage devices 31 of the same type as an HS.

In step D7, the ecological control unit 112 checks the storage type of the selected HS. As a result of the checking process, in a case where the selected HS (storage [6]) is a rotation speed-changeable HDD (see the route of "rotation speed-changeable HDD" of step D7), the process proceeds to step D8. In other words, in step D8, as represented in an item (6) illustrated in FIG. 13, the ecological control unit 112 sets the L-access mode to the HS (storage [6]). In other words, the HS that is the rotation speed-changeable HDD is caused to stand by in the ready mode. In addition, the ecological control unit 112 sets the P-off mode (cold mode) to the other unused storage device 31 not set in the HS.

On the other hand, in a case where the storage type of the selected HS (storage [6]) is not a rotation speed-changeable HDD but a normal HDD or SSD (see the route of "normal HDD or SSD" of step D7) as a result of the checking process, the process proceeds to step D9. In other words, in step D9, the ecological control unit 112 sets the H-access mode to the HS (storage [6]). Thereafter, the process ends.

In this process, while an example in which the storages [0 to 3, 5 and 6] are rotation speed-changeable HDDs has been illustrated, for storage devices 31 of another type, a process similar thereto is executed when a LUN is generated after the generation of a RAID. However, the H-access mode instead of the L-access mode is set to storage devices 31 other than the rotation speed-changeable HDDs.

(C) Advantage

In this way, according to the storage apparatus 1 as an example of the embodiment, the ecological control unit 112 sets the storage device 31 that is a rotation speed-changeable HDD to be in the L-access mode. Accordingly, the power consumption of the storage devices 31 can be reduced.

In addition, in a case where the HS is a rotation speed-changeable HDD, the ecological control unit 112 sets the HS to be in the L-access mode so as to stand by. Accordingly, the power consumption of the HS can be also reduced.

During the energy-saving operation, the ecological control unit 112 performs switching between the P-off mode and the M-off mode based on the count value used for determining mode switching. More specifically, in a case where the storage access number of times (the count value used for determining mode switching) during the energy-saving operation is twice or more, the ecological control unit 112 switches the mode from the L-access mode to the M-off mode. Since the storage device 31 can be operated in a shorter time in the M-off mode than in the P-off mode, by setting the M-off mode, also in a case where a storage access occurs during the energy-saving operation, the storage device 31 can be operated in a short time, whereby the apparatus performance can be improved.

(D) Others

The disclosed technology is not limited to the embodiment described above, but various changes can be made therein in a range not departing from the concept of this embodiment. Each configuration and each process according to this embodiment can be sorted out as is necessary, and the configurations and the processes of this embodiment may be appropriately combined.

For example, in the embodiment described above, while the load status of the storage device 31 is determined by using the number of I/O commands (command issuance number) issued from the host apparatus 2, the determination is not limited thereto, but various changes can be made.

According to the disclosure described as above, this embodiment can be executed and manufactured by those who skilled in the art.

According to one embodiment, effective power saving can be realized in a simple manner.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage control apparatus for controlling a plurality of storage devices, the storage control apparatus comprising: a checking unit configured to check whether or not each of the plurality of storage devices is a speed-changeable storage device capable of processing data at a low speed state, high speed state, power off state, motor off state; and a control unit configured to set a storage device among the plurality of storage devices that is checked to be the speed-changeable storage device to a first state operating at a low speed that is a first threshold or less in a case where a data access to the storage device does not occur
    wherein the control unit sets the storage device among the plurality of storage devices that is checked to be the speed-changeable storage device to the High speed state in a case where a data access above a threshold to the storage device occurs;
    wherein the control unit sets a storage device, of which the number of storage accesses during the power-saving operation is a predetermined threshold or more, among the plurality of storage devices to a motor off state stopping a part of the function of the storage device;
    wherein the control unit sets a storage device, of which the number of storage accesses during the power-saving operation is less than a predetermined threshold, to a power off state stopping power supply to a part of the storage device.

2. The storage control apparatus according to claim 1, wherein the control unit sets a storage device among the plurality of storage devices that is checked not to be the speed-changeable storage device to a second state operating at a high speed larger than the first threshold.

3. The storage control apparatus according to claim 1, wherein an unused storage device other than a preliminary storage device used instead of the storage device in which a failure occurs is set to be in the power off state.

4. The storage control apparatus according to claim 1, wherein in a case where a preliminary storage device used instead of the storage device in which a failure occurs is the speed-changeable storage device in a case where the failure occurs in one of the storage devices, the control unit operates the preliminary storage device at the low rotation speed.

5. A storage apparatus for controlling a plurality of storage devices, the storage apparatus comprising: a checking unit configured to check whether or not each of the plurality of storage devices is a speed-changeable storage device capable of processing data at a low speed state, high speed state, power off state, motor off state; and a control unit configured to set a storage device among the plurality of storage devices that is checked to be the speed-changeable storage device to a first state operating at a low speed that is a first threshold or less in a case where a data access to the storage device does not occur
    wherein the control unit sets the storage device among the plurality of storage devices that is checked to be the speed-changeable storage device to the high speed state in a case where a data access above a threshold to the storage device occurs;
    wherein the control unit sets a storage device, of which the number of storage accesses during the power-saving operation is a predetermined threshold or more, among the plurality of storage devices to a motor off state stopping a part of the function of the storage device;
    wherein the control unit sets a storage device, of which the number of storage accesses during the power-saving operation is less than a predetermined threshold, to a power off state stopping power supply to a part of the storage device.

6. The storage apparatus according to claim 5, wherein the control unit sets a storage device among the plurality of storage devices that is checked not to be the speed-changeable storage device to a second state operating at a high speed larger than the first threshold.

7. The storage apparatus according to claim 5, wherein an unused storage device other than a preliminary storage device used instead of the storage device in which a failure occurs is set to be in the power off state.

8. The storage apparatus according to claim 5, wherein in a case where a preliminary storage device used instead of the storage device in which a failure occurs is the speed-changeable storage device in a case where the failure occurs in one of the storage devices, the control unit operates the preliminary storage device at the low speed.

9. A non-transitory computer-readable recording medium having stored therein a storage control program for causing a processor to execute a process in a storage control apparatus including the processor and controlling a plurality of storage devices, the process comprising: checking whether or not each of the plurality of storage devices is a speed-changeable storage device capable of processing data at a low speed state, high speed state, power off state, motor off state; and setting a storage device among the plurality of storage devices that is checked to be the speed-changeable storage device to a first state operating at a low speed that is a first threshold or less in a case where a data access to the storage device does not occur wherein the control unit sets the storage device among the plurality of storage devices that is checked to be the speed-changeable storage device to the high speed state in a case where a data access above a threshold to the storage device occurs;

wherein the control unit sets a storage device, of which the number of storage accesses during the power-saving operation is a predetermined threshold or more, among the plurality of storage devices to a motor off state stopping a part of the function of the storage device;

wherein the control unit sets a storage device, of which the number of storage accesses during the power-saving operation is less than a predetermined threshold, to a power off state stopping power supply to a part of the storage device.

10. The non-transitory computer-readable recording medium according to claim 9, wherein the process further comprises setting a storage device among the plurality of storage devices that is checked not to be the speed-changeable storage device to a second state operating at a high speed larger than the first threshold.

11. The non-transitory computer-readable recording medium according claim 9, wherein the process further comprises setting an unused storage device other than a preliminary storage device used instead of the storage device in which a failure occurs to the fourth state.

* * * * *